United States Patent [19]

Marshall

[11] Patent Number: 4,830,160
[45] Date of Patent: May 16, 1989

[54] CLUTCH ASSEMBLY

[75] Inventor: Maurice Marshall, Pretoria, South Africa

[73] Assignee: Pretoria Auto Frictions (Proprietary) Limited, Pretoria, South Africa

[21] Appl. No.: 108,959

[22] Filed: Oct. 16, 1987

[51] Int. Cl.$^4$ .................. F16D 13/72; F16D 13/50
[52] U.S. Cl. ................... 192/70.12; 192/70.3; 192/113 A
[58] Field of Search ............ 192/70.12, 113 A, 70.29, 192/70.3

[56] References Cited

U.S. PATENT DOCUMENTS

| | | | |
|---|---|---|---|
| 1,767,309 | 6/1930 | Ricardo | 192/113 A |
| 2,002,943 | 5/1935 | Hartley | 192/113 A |
| 2,205,629 | 6/1940 | Peterson | 192/70.12 |

*Primary Examiner*—Rodney H. Bonck
*Assistant Examiner*—David A. Testardi
*Attorney, Agent, or Firm*—Birch, Stewart, Kolasch & Birch

[57] ABSTRACT

In a pressure plate and cover assembly having a dished cover and a pressure plate, the pressure plate has inclined deflector vanes for deflecting ambient air radially inwardly over the face of the pressure plate. Coiled springs are received in sockets formed in the pressure plate while the cover has projections that fit into the springs.

3 Claims, 3 Drawing Sheets

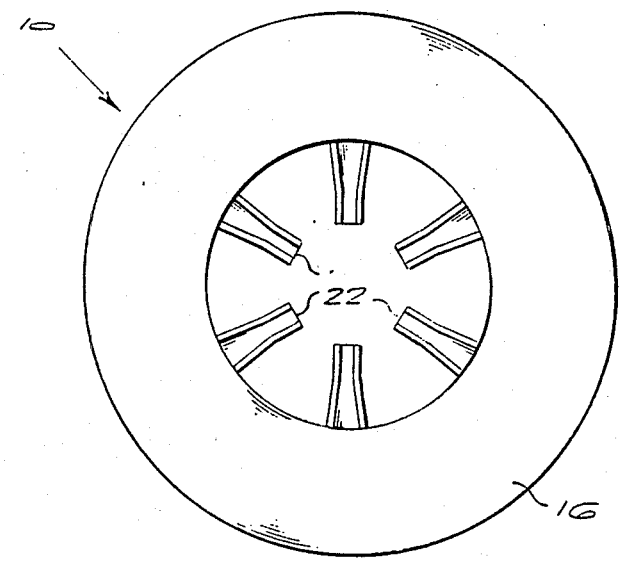
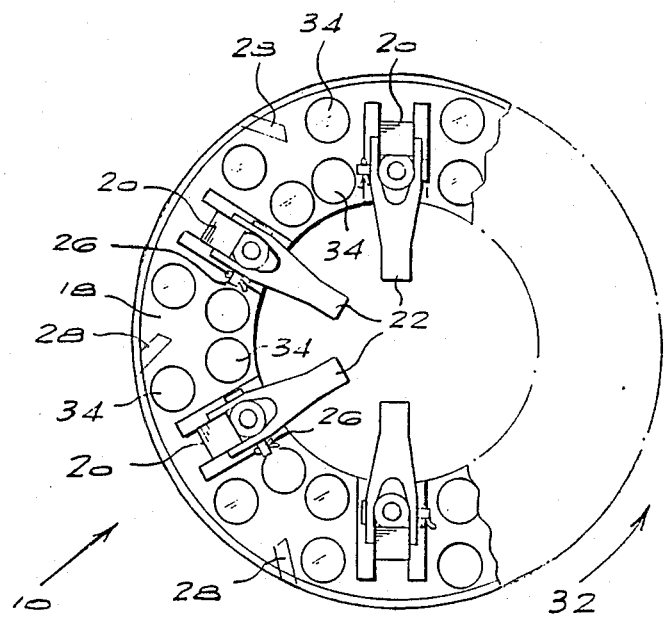

CLUTCH ASSEMBLY

BACKGROUND TO THE INVENTION

This invention relates to a clutch pressure plate and cover assembly. The assembly of the invention forms part of a clutch which is particularly suitable for heavy duty vehicles such as trucks.

One of the major problems in clutch assemblies, and particularly in such assemblies used for heavy-duty vehicles, is overheating of the clutch components with frequent clutch operations.

An object of the present invention is to provide a clutch pressure plate and cover assembly which is designed to alleviate the overheating problem.

SUMMARY OF THE INVENTION

In accordance with the present invention, there is provided a pressure plate and cover assembly for a motor vehicle clutch, the assembly comprising:

(a) an annular pressure plate having a first face for engaging a driven friction plate and a second face on the opposite side thereof from the first face, the second face carrying release lever mounting lugs; and (b) a dished cover dimensioned to receive the pressure plate and having a base and a peripheral skirt formed with ventilation openings, characterised in that the second face of the pressure plate, which faces the base of the cover, carries inclined air deflector vanes adapted to direct ambient air entering the cover through the ventilation openings inwardly over the second face, in that the second face of the pressure plate is formed with sockets for receiving the ends of compression coil springs which act in use between the pressure plate and the cover, and in that the inner surface of the base of the cover has corresponding projections for locating the opposite ends of the springs.

It is preferred that the spring-locating projections of the cover are short enough to cause no significant obstruction to ventilating air directed inwardly by the air deflector vanes.

It is also preferred that the air deflector vanes be inclined with respect to radii of the pressure plate.

For enhanced ventilation, each air deflector vane should be located opposite a ventilation opening in the skirt of the cover.

According to yet another preferred feature, intended to increase the robustness of the cover, the skirt of the cover has a continuous rim.

BRIEF DESCRIPTION OF THE DRAWINGS

The invention will now be described in more detail with reference to the accompanying drawings in which:

FIG. 3 shows an elevation of the pressure plate from the friction side;

FIG. 4 shows an elevation of the pressure plate from the opposite side; and

DESCRIPTION OF A PREFERRED EMBODIMENT

Figure 1:
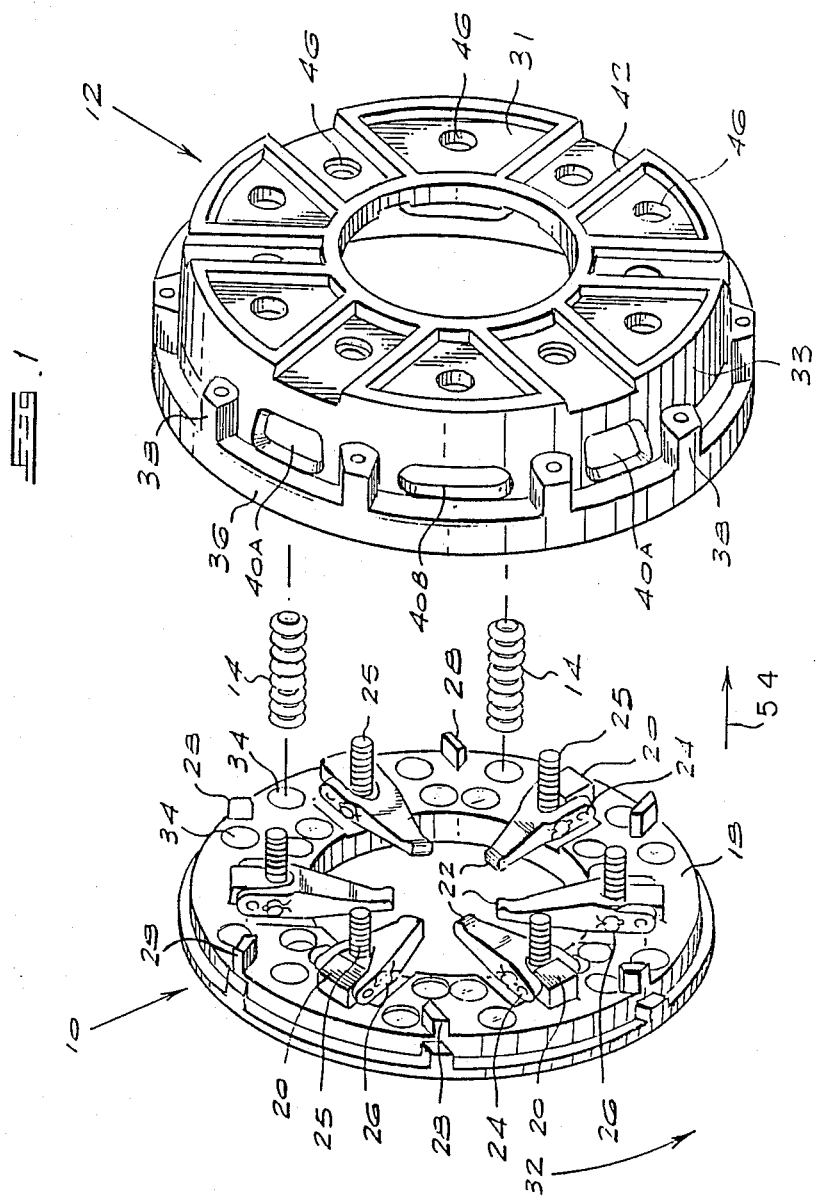
FIG. 1 shows an exploded perspective view of a clutch pressure plate and cover assembly of the invention.

FIG. 1 shows a pressure plate 10 and a cover 12 forming an assembly according to the invention. This Figure also illustrates compression coil springs 14 which are located between the pressure plate 10 and cover 12 in the manner to be described in the following description.

Figure 2:
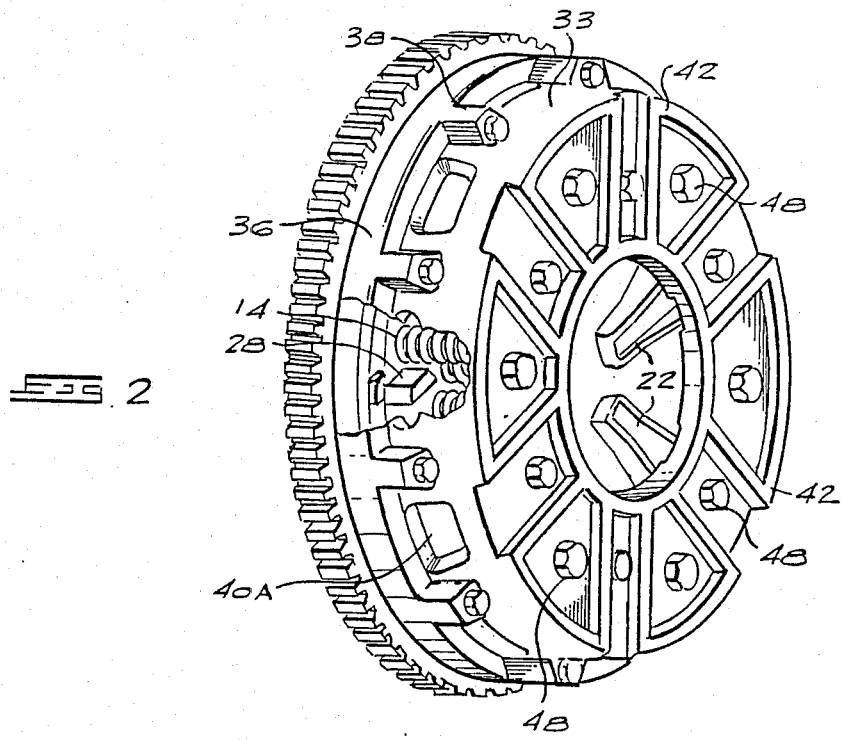
FIG. 2 shows a perspective view of the assembly in the assembled state, the cover being shown partially cut away for viewing of the interior components.
Figure 5:
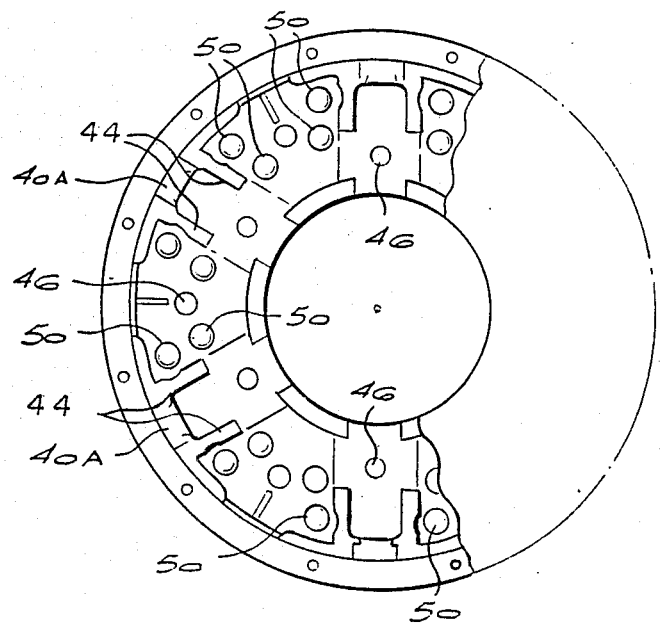
FIG. 5 shows an elevation of the cover from the pressure plate side.

The assembly seen in FIGS. 1 and 2 forms part of a clutch whose other components, such as engine flywheel, driven friction plate, thrust pad, thrust bearing and associated actuating components, are not shown in the drawings. Such other components form no part of the present invention and may be taken as conventional.

Reference will be made firstly to the pressure plate 10. As seen in FIG. 3, one face 16 of the annular pressure plate 10 is machined smooth. In operation, this face acts on the driven clutch plate and clamps it to the engine flywheel in the conventional fashion. The opposite face 18 of the pressure plate 10 is formed with six angularly spaced, robust lugs 20 to which release levers 22 are pivoted by means of pins 24 which pass through the lugs 20. The release levers carry threaded bolts 25 which are pivoted to the release levers by means of pins 26.

Angularly spaced between the lug and release lever assemblies are air deflector vanes 28 which are inclined with respect to radial lines of the pressure plate 10. The direction of operative rotation of the pressure plate is indicated with the numeral 32 and it will be seen that the function of the vanes 28 is to deflect ambient air inwardly over the face 18 of the pressure plate.

Also located between each neighbouring pair of lug and release lever assemblies are four shallow, circular sockets 34 formed in the face 18. These sockets receive the ends of the compression coils springs 14.

The pressure plate 10 with its lugs 20 and vanes 28 is formed integrally as a casting which is subsequently machined as necessary. The release levers 22 and bolts 25 are subsequently fitted to the pressure plate using the pins 24 and 26.

The dished cover 12 is of particularly robust construction. It is in the form of an integral casting and has an annular base 31 and a skirt 33 with a continuous rim 36 as opposed to conventional covers which have gaps in the rim. The provision of a continuous rim enhances the overall strength of the cover. The rim is formed with peripheral lugs 38 through which bolts are passed to bolt the cover to the flywheel in the normal way. Between the lugs 38 ventilation openings 40A and 40B are formed. It will be noted that there is a total of twelve openings 40A, 40B.

The outer surface of the base of the cover 12 is formed with a pattern of ribs 42 which serve to strengthen the cover. The interior of the cover is provided with six pairs of substantially radial lugs 44, and lugs 44 of each pair being located to either side of a ventilation opening 40A. When the pressure plate is assembled to the cover, the lugs 20 and release lever assemblies locate between the lugs 44, with the bolts 25 passing outwardly through holes 46 in the cover. Nuts and washers 48 are fitted to the protruding ends of the bolts 25 to secure the pressure plate to the cover.

Four projections 50 are located on the inner surface of the cover between the pairs of lugs 44. These projections serve to locate the opposite ends of the compression coil springs 14 and, when the pressure plate is assembled to the cover, are located opposite the sockets 34 on the pressure plate. The illustrated embodiment will have a total of 24 coil springs, most of which are omitted from FIG. 1 in the interests of clarity of illustration.

FIG. 2 shows the assembled device. In this situation, the coil springs are placed in compression between the pressure plate and the cover. The deflector vanes 28 are located opposite the ventilation openings 40B and serve to draw ambient air inwardly through those openings and to deflect that air into the cover and over the pressure plate, thereby cooling the latter. It will be noted that the projections 50 are relatively short and will not significantly hamper the free flow of ventilating and cooling air over the interior components. The fact that the projections 50 are on the cover is in contrast to prior designs in which the projections are formed on the pressure plate. Furthermore, the spring-locating projections of prior designs are substantially longer than the illustrated projections. The use of long projections in the present design would clearly be counter-productive in that the projections would tend to obstruct the free flow of ventilating air. Of course, the springs 14 themselves will lie in the air flow path but will not cause undue air obstruction.

Thus the major advantage of the invention is the fact that provision is made for efficient cooling of the clutch assembly components without there being spring-locating projections to hamper the air flow.

Referring again to FIG. 2, it will be noted that the release levers 22 project inwardly relative to the central opening 52 in the cover. As is conventional, the inner ends of these levers will be acted upon in use by a thrust pad actuated by the normal thrust bearing and fork assembly to pull the pressure plate away from the driven friction plate to disengage the clutch. Such movement of the pressure plate, in the direction of the arrow 54 in FIG. 1, will of course be opposed by the springs which will be placed under further compression as the pressure plate moves further into the cover 12.

I claim:

1. A pressure plate and cover assembly for a motor vehicle clutch driven by an engine in a forward rotation, the assembly comprising:
    (a) an annular pressure plate having a first face for engaging a driven friction plate and a second face on the opposite side thereof from the first face, the second face carrying release lever mounting lugs and air deflector vanes;
    (b) a dished cover dimensioned to receive the pressure plate and having a base and a peripheral skirt formed with ventilation openings, wherein the air deflector vanes stand proud of the second face of the pressure plate, are situated close to the periphery of the second face of the pressure plate adjacent the ventilation openings and are so inclined to radii of the second face as to provide means for deflecting a flow of cooling ambient air from outside the cover, inwardly, through the ventilation openings and over the second face of the pressure plate when the assembly is in the forward rotation, and wherein the second face of the pressure plate is formed with sockets for receiving the ends of compression coil springs acting between the pressure plate and the base of the cover, the base of the cover having projections opposite to the sockets for locating the opposite ends of the compression coil springs, such projections being short enough to present no significant obstruction to the flow of cooling air over the second face of the pressure plate.

2. A pressure plate and cover assembly according to claim 1, wherein each of said air deflector vanes is located opposite a ventilation opening in the peripheral skirt of said cover.

3. A pressure plate and cover assembly according to claim 1, wherein said skirt has a continuous rim.

* * * * *